April 27, 1926.
M. SZÜR
1,582,801
DOUGH MIXER
Filed Dec. 6, 1924
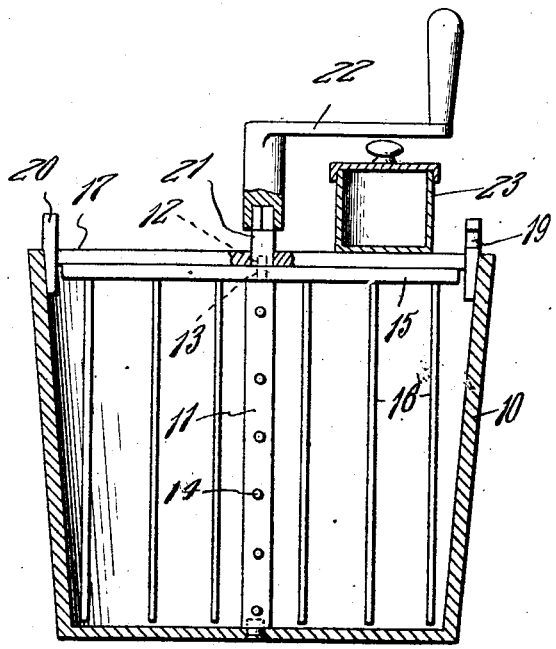
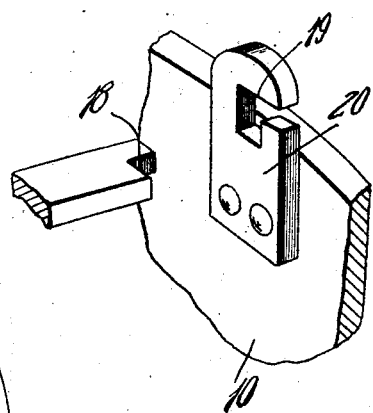
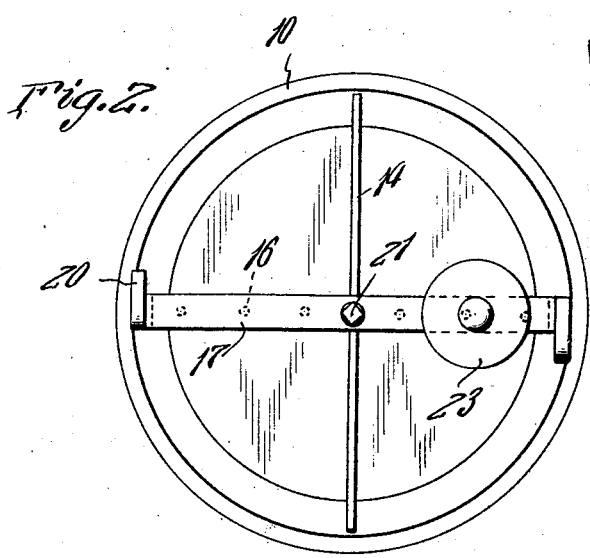
Michael Szür
INVENTOR
BY Victor J. Evans
ATTORNEY Patented Apr. 27, 1926.

1,582,801

UNITED STATES PATENT OFFICE.

MICHAEL SZÜR, OF SHARON, PENNSYLVANIA, ASSIGNOR OF ONE-HALF TO CHARLES RAJKI, OF SHARON, PENNSYLVANIA.

DOUGH MIXER.

Application filed December 6, 1924. Serial No. 754,427.

*To all whom it may concern:*

Be it known that I, MICHAEL SZÜR, a citizen of the Republic of Hungary, residing at Sharon, in the county of Mercer and State of Pennsylvania, have invented new and useful Improvements in Dough Mixers, of which the following is a specification.

This invention relates to dough mixing machines and has for an object the provision of a manually operated machine of this character which is simple in construction, easy to operate and by means of which dough may be quickly and thoroughly mixed.

With the above and other objects in view, the invention further includes the following novel features and details of construction, to be hereinafter more fully described, illustrated in the accompanying drawings and pointed out in the appended claims.

In the drawings:—

Figure 1 is a sectional view of a mixing machine constructed in accordance with the invention.

Figure 2 is a top plan view of the same.

Figure 3 is a fragmentary perspective view illustrating the manner of holding the retaining bar in place.

Referring to the drawings in detail wherein like characters of reference denote corresponding parts, the reference character 10 indicates a container or receptacle which is adapted to receive the dough mixture. This container or receptacle has removably secured thereon a vertically disposed centrally located shaft 11, whose upper end is provided with a reduced extension 12, which provides a shoulder 13. Extending radially from the shaft 11 are vertically spaced horizontally disposed bars or rods 14, while mounted upon the reduced extension 12 and resting upon the shoulder 13 is a bar 15.

Secured to and extending outwardly from the bar 15 are radially spaced vertically disposed bars or rods 16. The bar 15 is secured to a transversely disposed retaining bar 17, the opposite ends of which are reduced as indicated at 18. These reduced ends 18 of the bar 17 are adapted to be removably positioned within openings 19 provided in retaining plates 20, the latter being secured to the container 10.

Secured to the extension 12 and operating within an opening provided in the bar 17 is a socketed member 21 which is adapted to removably receive and engage the socketed end of an operating crank 22.

The bar 15 is held stationary and by operating the crank 22, limited rotary movement may be imparted to the shaft 11 and consequently to the bars 14, so that an oscillatory movement may be imparted to the bars 14. This will act to force the mixture backward and forward through the bars 14 and 16 so that the ingredients will be thoroughly mixed.

A receptacle 23 may be mounted upon the bar 17 for the purpose of containing one or more of the ingredients used in the mixture.

The invention is susceptible of various changes in its form, proportions and minor details of construction and the right is herein reserved to make such changes as properly fall within the scope of the appended claims.

Having described the invention what is claimed is:—

1. A dough mixer comprising a container, a plurality of spaced vertically disposed stationary rods therein, a plurality of vertically spaced horizontally disposed rods within the container and means whereby an oscillatory movement may be imparted to the horizontally disposed rods.

2. A dough mixer comprising a container, a plurality of diametrically spaced vertically disposed stationary rods therein, a vertically disposed central shaft located within the container, a plurality of vertically spaced horizontally disposed rods extending from said shaft and means whereby the shaft may be rotated to impart an oscillatory movement to the horizontal rods.

3. A dough mixer comprising a container, a diametrically disposed arm extending horizontally across the top thereof, a plurality of spaced vertical rods extending downwardly from the arm, a vertically disposed central shaft located within the container, a plurality of vertically spaced horizontally disposed ribs extending from said shaft and means whereby the shaft may be rotated to impart an oscillatory movement to the horizontal rods.

In testimony whereof I affix my signature.

MICHAEL SZÜR.